US008270986B1

(12) United States Patent
Nucci et al.

(10) Patent No.: US 8,270,986 B1
(45) Date of Patent: Sep. 18, 2012

(54) ALLOCATING DROP ZONES IN A MOBILE COMMUNICATION NETWORK

(75) Inventors: Antonio Nucci, San Jose, CA (US); Supranamaya Ranjan, Albany, CA (US); Aleksandar Kuzmanovic, Evanston, CA (US); Ionut Trestian, Evanston, CA (US)

(73) Assignee: Narus, Inc., Sunnyvale, CA (US)

( * ) Notice: Subject to any disclaimer, the term of this patent is extended or adjusted under 35 U.S.C. 154(b) by 266 days.

(21) Appl. No.: 12/785,381

(22) Filed: May 21, 2010

(51) Int. Cl.
*H04W 72/00* (2009.01)

(52) U.S. Cl. ........ 455/450; 455/423; 455/424; 455/425; 455/452.2; 455/422.1; 370/329

(58) Field of Classification Search .................. 455/450, 455/423, 424, 425, 452.2, 422.1, 456.1, 421; 370/328, 329
See application file for complete search history.

(56) References Cited

U.S. PATENT DOCUMENTS

| | | | | |
|---|---|---|---|---|
| 6,427,075 | B1 * | 7/2002 | Burg et al. | 455/422.1 |
| 6,721,572 | B1 * | 4/2004 | Smith et al. | 455/456.1 |
| 2004/0253962 | A1 * | 12/2004 | Ganti et al. | 455/452.1 |
| 2007/0076693 | A1 * | 4/2007 | Krishnaswamy | 370/352 |

OTHER PUBLICATIONS

Chaintreau, A. et al., "Impact of Human Mobility on Opportunistic Forwarding Algorithms", IEEE Transactions on Mobile Computing, Jun. 2007 pp. 607-662, vol. 6, No. 6.

Bhattacharya, A. et al., "LeZi-Update: An Information-Theoretic Approach to Track Mobile Users in PCS Networks", Proceedings of the 5th annual ACM/IEEEi nternational Association for Computing Machinery (ACM), New York, USA.

Rodriguez, P. et al., "MAR: A Commuter Router Infrastructure for the Mobile Internet" Proceedings of the 2nd international conference on Mobile systems, applications, and services (MobiSys'04), Jun. 6-9, 2004 Boston, Massachusetts, USA., pp. 217-230, Association for Computing Machinery (ACM), New York, USA.

Erramilli, V. et al., "Delegation Forwarding", Proceedings of the 9th ACM international symposium on Mobile ad hoc networking (MobiHoc'08), May 26-30, 2008, Hong Kong SAR, China, pp. 251-259, Association for Computing Machinery (ACM), New York, USA.

* cited by examiner

*Primary Examiner* — Kathy Wang-Hurst
(74) *Attorney, Agent, or Firm* — Fernandez & Associates, LLP

(57) ABSTRACT

A method for content transmission in a cellular network having a collection of cellular zones. The method includes obtaining a statistical trace associated with the cellular network, comprising attributes of historical content chunks received from prior users of the cellular network and trajectories of the prior users moving within the cellular zones, analyzing the statistical trace to identify a portion of the cellular zones as drop zones, allocating drop zone transmission bandwidth to the drop zones based on a pre-determined criterion, receiving, subsequent to the allocating, a transmission request for a content chunk from a mobile device of a user outside the drop zones, delaying transmission of the content chunk while the mobile device remains outside of the drop zones, and transmitting the content chunk in response to detecting the mobile device within the drop zones.

13 Claims, 8 Drawing Sheets

ALLOCATING DROP ZONES IN A MOBILE COMMUNICATION NETWORK

BACKGROUND OF THE INVENTION

1. Field of the Invention

The present invention relates to computers and computer networks. More particularly, the invention relates to allocating communication bandwidth for cellular zones within a mobile network.

2. Background of the Related Art

Cellular network providers are faced with an increasing challenge when offering data services over their networks. Smartphones have changed the landscape. Network subscribers are no longer consumer but more and more producers. In the last several years, the production and consumption of digital media over cellular networks has evolved dramatically, and it is continuing to grow at an exponential pace. As an example, it is expected that by 2013 more than 140 million mobile subscribers worldwide will use social networking applications that enable them to share photos, videos, or other user-generated contents with their friend circles using their phones. The main problem caused by the booming driving force is that subscribers are no longer only consuming data, but have also started creating content at an exponential pace. This happened due to higher processing power and higher capability mobile devices that became available for mass-market prices around the world. In addition, the opening of the mobile ecosystem has attracted thousands of developers who are building compelling applications and services for various mobile platforms. The load induced by the user-generated content creates problems to mobile network providers on a daily basis.

Contrary to "traditional" content, user-generated content is unique and often meaningful only to a user and his social circle. Hence, traditional content delivery methods, including caching that would at least reduce the long-haul burden on the provider are incapable of addressing this issue. In light of the above changes, cellular network providers are rushed to address the problem and keep up with the explosion of content production and consumer interest that drives the traffic increase. In the absence of viable solutions, some providers started considering charging special usage fees to subscribers with heavy data usage.

SUMMARY

In general, in one aspect, the invention relates to a method for content transmission in a cellular network having a plurality of cellular zones. The method includes obtaining a statistical trace associated with the cellular network, wherein the statistical trace comprises attributes of historical content chunks received from prior users of the cellular network and trajectories of the prior users moving within the plurality of cellular zones, wherein the attributes of the historical content chunks are indexed by the plurality of cellular zones, analyzing, using a central processing unit (CPU) of a computer, the statistical trace to identify a portion of the plurality of cellular zones as drop zones, allocating drop zone transmission bandwidth to the drop zones based on a pre-determined criterion, receiving, subsequent to the allocating, a transmission request for a content chunk from a mobile device of a user outside the drop zones, delaying transmission of the content chunk while the mobile device remains outside of the drop zones, and transmitting the content chunk in response to detecting the mobile device within the drop zones.

In general, in one aspect, the invention relates to a non-transitory computer readable medium storing instructions for content transmission in a cellular network having a plurality of cellular zones. The instructions when executed by a processor of a computer includes functionality for receiving, by a mobile device of a user, a command from the user to transmit a content chunk, identifying, by the mobile device, the mobile device being outside a portion of the plurality of cellular zones designated as drop zones, wherein the drop zones are configured with upgraded communication bandwidth based on a pre-determined criterion, and delaying, by the mobile device, transmitting the content chunk in response to detecting the mobile device being outside the drop zones, identifying, by the mobile device, the mobile device being within the drop zones, and transmitting, by the mobile device, the content chunk in response to detecting the mobile device being within the drop zones, wherein the portion of the plurality of cellular zones is designated as drop zones by analyzing a statistical trace associated with the cellular network, wherein the statistical trace comprises attributes of historical content chunks received from prior users of the cellular network and trajectories of the prior users moving within the plurality of cellular zones, wherein the attributes of the historical content chunks are indexed by the plurality of cellular zones.

In general, in one aspect, the invention relates to a system for content transmission in a cellular network having a plurality of cellular zones. The system includes a statistical trace associated with the cellular network, comprising attributes of historical content chunks received from prior users of the cellular network and trajectories of the prior users moving within the plurality of cellular zones, wherein the attributes of the historical content chunks are indexed by the plurality of cellular zones, a statistical trace analyzer configured to analyze the statistical trace to identify a portion of the plurality of cellular zones as drop zones, and a network controller configured to allocate drop zone transmission bandwidth to the drop zones based on a pre-determined criterion, receive, subsequent to the allocating, a transmission request for a content chunk from a mobile device of a user outside the drop zones, delay transmission of the content chunk while the mobile device remains outside of the drop zones, and transmit the content chunk in response to detecting the mobile device within the drop zones.

Other aspects and advantages of the invention will be apparent from the following description and the appended claims.

DETAILED DESCRIPTION

Figure 1:
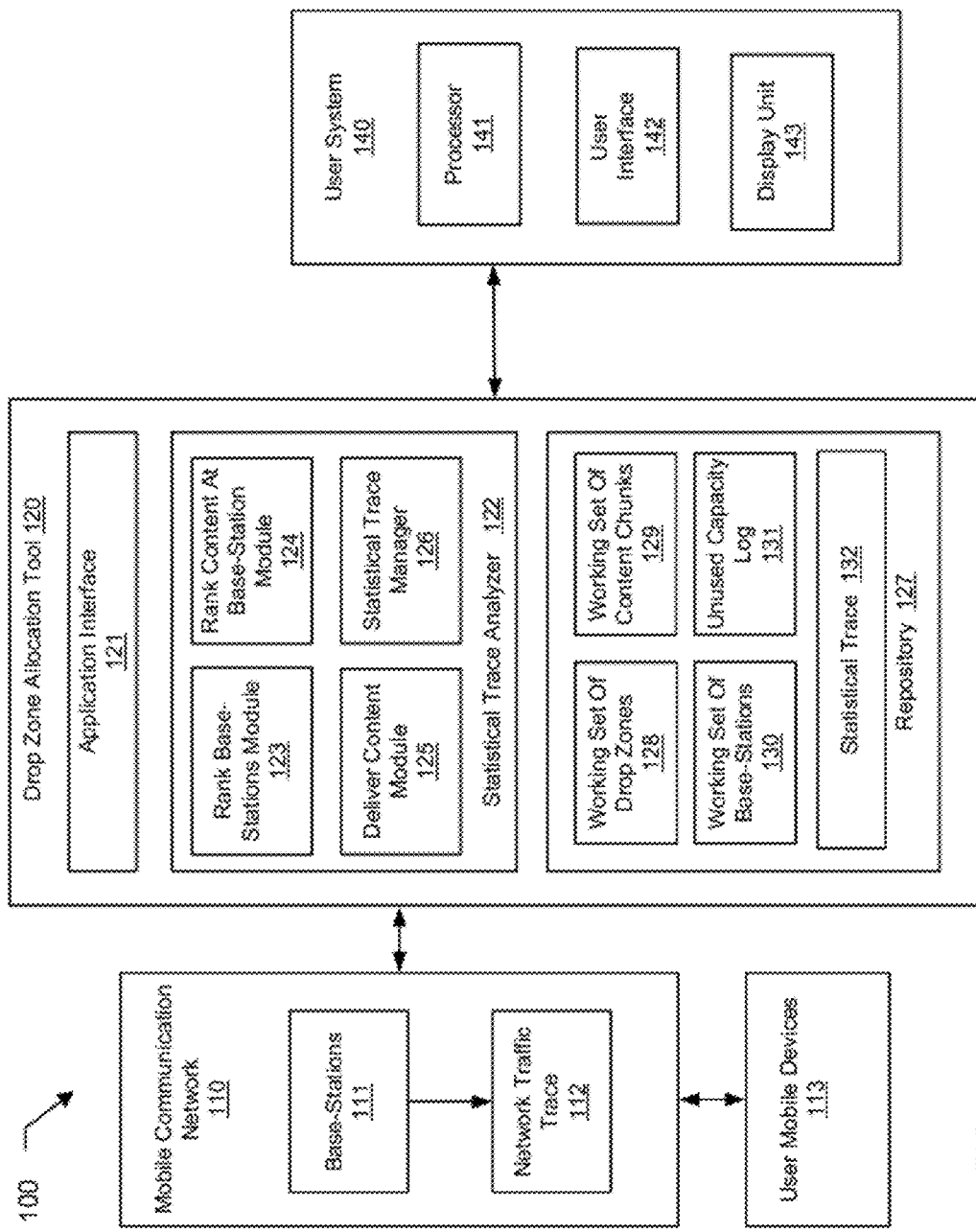
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Generally speaking, the invention relates to a system and method for mobile communication network (e.g., cellular network) data transmission by disproportionally upgrading bandwidth in a small subset of existing network communication equipments. The locations covered by such subset of upgraded network communication equipments are referred to as drop zones. In one or more embodiments of the invention, the user's data access (e.g., upload or download) using the mobile device is postponed until the user (with the mobile device) travels within coverage of the drop zones. In particular, the content is tagged for postponed delivery (e.g., upload or download) in response to user's initial attempt for uploading from or downloading to the mobile device. Accordingly, the cellular network provider can take advantage of a collection of users' daily commute patterns to determine a smaller number of strategic locations for drop zone bandwidth upgrade where the postponed content deliveries may take place opportunistically during users' commutes. Although wide-spread uploading activities of user generated contents contribute to the current mobile communication network traffic growth, embodiments of the invention may be used relating to data uploading, downloading, or combinations thereof. Throughout this document, the terms "data access", "delivery", "transmission", "data communication loading", and "network loading" may refer to either uploading or downloading depending on the context. The term "user" may refer, depending on the context, to either a user who is a mobile network subscriber or a user who is using the drop zone allocation tool of the present invention. Further, examples of cellular network or mobile communication network may include but not limited to cellular phone or mobile phone network supporting voice and data communication.

FIG. 1 shows a diagram of a system (100) for allocating drop zones in a mobile communication network and utilizing allocated drop zones to perform postponed content transmission in accordance with one or more embodiments. The system (100) includes a drop zone allocation tool (120), a user system (140), a mobile communication network (110), and user mobile devices (113). The drop zone allocation tool (120) includes a storage repository (127), one or more application interfaces (121), and a statistical trace analyzer (122). The user system (140) includes a processor (141), a user interface (142), and, a display unit (143). Each of these components is described below. One of ordinary skill in the art will appreciate that embodiments are not limited to the configuration shown in FIG. 1.

In one or more embodiments of the invention, the drop zone allocation tool (120) is configured to interact with the mobile communication network (110) using one or more of the application interface(s) (121). The application interface (121) may be configured to receive data (e.g., network traffic trace (112)) from the mobile communication network (110) and/or store data (e.g., statistical trace (132)) to the storage repository (127). For example, the network traffic trace (112) may be captured on a routine basis in the mobile communication network (110) and selectively sent to the application interface (121) from time to time to be formatted and stored in the repository (127) as the statistical trace (132). For example, the network traffic trace (112) may be captured in the mobile communication network (110) by a provider thereof. The network traffic trace (112) may then be formatted within the drop zone allocation tool (120) into a particular format as the statistical trace (132). Examples of network traffic trace (112) and statistical trace (132) are described in reference to FIGS. 2A-2D below. In addition, the application interface (121) may be configured to receive data (e.g., final result of the working set of drop zones (128) containing base-stations allocated as drop zones) from the storage repository (127) and deliver the data to a bandwidth configuration controller (not shown) of the mobile communication network (110). The mobile communication network (110) may be one of a variety of networks providing data communication functionality to subscribers, such as the user mobile devices (113). The mobile communication network (110) may include, but is not limited to, a cellular network where a number of cellular zones each with pre-determined local coverage that collectively provide communication functionality to mobile users moving about within an overall network coverage area. The mobile communication network (110) may be configured to provide historical data (e.g., statistical trace (132)) to the application interface (121) through an automated process, such as through a web-based application, a direct feed, or some other form of automated process. Such data may be provided on a periodic basis (e.g., annually, quarterly, monthly, weekly, daily, hourly, etc.) or based on a trigger. For example, the trigger may be activated automatically in response to an event in the mobile communication network (110) or activated manually through the user system (140).

In one or more embodiments of the invention, the mobile communication network (110), specifically, a bandwidth configuration controller thereof may use data (e.g., identification of base-stations allocated as drop zones) received from the drop zone allocation tool (120) to configure the base-stations (111). In one or more embodiments, in response to receiving the aforementioned identification of drop zones from the drop zone allocation tool (120), the bandwidth configuration controller upgrades bandwidth of the drop zones using schemes known to those skilled in the art.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) is configured to interact with a user using the user interface (142). The user interface (142) may be configured to receive data and/or instruction(s) from the user. The user interface (142) may also be configured to deliver instruction(s) to the user. In addition, the user interface (142) may be configured to send data and/or instruction(s) to, and receive data and/or instruction(s) from, the drop zone allocation tool (120). The user may include, but is not limited to, an individual, a group, an organization, or some other legal entity having authority and/or responsibility to access the drop zone allocation tool (120). As noted above, the context of the term "user" here is distinct from that of a subscriber user of the mobile communication network (110). The user system (140) may be, or may contain a form of, an internet-based communication device that is capable of communicating with the application interface (121) of the drop zone allocation tool (120). Alternatively, the drop zone allocation tool (120) may be part of the user system (140). The user system (140) may correspond to, but is not limited to, a workstation, a desktop computer, a laptop computer, or other user computing device.

In one or more embodiments, the user system (140) may include a display unit (143). The display unit (143) may be a two dimensional (2D) or a three dimensional (3D) display configured to display information regarding the mobile communication network (e.g., browsing the network traffic trace (112), statistical trace (132)) or to display intermediate and/or final results of the statistical trace analyzer (122) (e.g., contents of the various working sets (128, 129, 130), unused capacity log (131), etc.).

As shown, communication links are provided between the drop zone allocation tool (120), the mobile communication network (110), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired and wireless.

In one or more embodiments, a central processing unit (CPU, not shown) of the drop zone allocation tool (120) is configured to execute instructions to operate the components of the drop zone allocation tool (120) (e.g., storage repository (127), the application interface (121), and the statistical trace analyzer (122)). In one or more embodiments, the memory (not shown) of the drop zone allocation tool (120) is configured to store software instructions for analyzing the statistical trace (132) to determine drop zone allocations of the base-stations (111). The memory may be one of a variety of memory devices, including but not limited to random access memory (RAM), read-only memory (ROM), cache memory, and flash memory. The memory may be further configured to serve as back-up storage for information stored in the storage repository (127).

In one or more embodiments, the drop zone allocation tool (120) is configured to obtain and store data in the storage repository (127). In one or more embodiments, the storage repository (127) is a persistent storage device (or set of devices) and is configured to receive data from the mobile communication network (110) using the application interface (121). The storage repository (127) is also configured to deliver working data to, and receive working data from, the statistical trace analyzer (122). The storage repository (127) may be a data store (e.g., a database, a file system, one or more data structures configured in a memory, some other medium for storing data, or any suitable combination thereof), which may include information (e.g., historical data, user information, base-station location information) related to the drop zone allocation. The storage repository (127) may be a device internal to the drop zone allocation tool (120). Alternatively, the storage repository (127) may be an external storage device operatively connected to the drop zone allocation tool (120).

In one or more embodiments, the drop zone allocation tool (120) is configured to interact with the user system (140) using the application interface (121). The application interface (121) may be configured to receive data and/or instruction(s) from the user system (140). The application interface (121) may also be configured to deliver instruction(s) to the user system (140). In addition, the application interface (121) may be configured to send data and/or instruction(s) to, and receive data and/or instruction(s) from, the storage repository (127), the statistical trace analyzer (122), and the mobile communication network (110).

In one or more embodiments, the data transferred between the application interface (121) and the mobile communication network (110) corresponds to user data and movement trajectory of the user mobile devices (113) and/or other information in the network traffic trace (112). In one or more embodiments, the drop zone allocation tool (120) is configured to support various data formats provided by the mobile communication network (110) and/or the user system (140).

Generally speaking, the drop zone allocation tool (120) is configured to perform analysis of the statistical trace (132) and substitute original (i.e., historical) data transmissions in the statistical trace (132) using modeled (i.e., simulated) drop zone based postponed transmissions with the requirement to meet pre-determined network resource (e.g., base-station capacity) and user tolerance (e.g., tolerable delay) constraints. Accordingly, drop zone allocation may be determined as a result of the analysis and modeling based on the requirements of the pre-determined network resource and user tolerance constraints.

In one or more embodiments, the drop zone allocation tool (120) is configured to perform the aforementioned analysis of the statistical trace (132) using the rank base-stations module (123) configured to assign priority to base-stations (111) according to trajectory based content count (TBCC). More details of the rank base-stations module (123) functionality are described in reference to TABLE 2 and FIG. 3B below.

In one or more embodiments, the drop zone allocation tool (120) is configured to perform the aforementioned analysis and modeling of the statistical trace (132) using the rank content at base-station module (124) configured to assign priority assigns priority, according to tolerable delay allocated capacity (TDAC), to each content chunk (e.g., a content chunk in the statistical trace (132)) served by a base-station (e.g., one of the base-stations (111)) identified using the rank base-stations module (123). More details of the rank content at base-station module (124) functionality are described in reference to TABLE 2 and FIG. 3B below.

In one or more embodiments, the drop zone allocation tool (120) is configured to perform the aforementioned analysis and modeling of the statistical trace (132) using the deliver content module (125) configured to deliver a historical content chunk (e.g., a content chunk in the statistical trace (132)), identified using the rank content at base-station module (124), at the base-station (e.g., one of the base-stations (111)) identified using the rank base-stations module (123). More details of the deliver content module (125) functionality are described in reference to TABLE 2 and FIG. 3B below.

In one or more embodiments, the drop zone allocation tool (120) is configured to perform the aforementioned analysis and modeling of the statistical trace (132) using the statistical trace manager (126) configured to obtain the statistical trace (132) from the mobile communication network (110), activate the rank base-stations module (123), rank content at base-station module (124), and deliver content module (125) and update/adjust the working set of drop zones (128), working set of content chunks (129), working set of base-stations (130), and unused capacity log (131) used by the rank base-stations module (123), rank content at base-station module (124), and deliver content module (125) in performing the aforementioned analysis of the statistical trace (132). More details of the statistical trace manager (126) functionality are described in reference to TABLE 2 and FIG. 3B below.

The drop zone allocation tool (120) may include one or more system computers, which may be implemented as a server or any conventional computing system However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network personal computers, minicomputers, mainframe computers, and the like.

While specific components are depicted and/or described for use in the units and/or modules of the statistical trace analyzer (122), it will be appreciated that a variety of components with various functions may be used to provide the formatting, processing, utility and coordination functions necessary to modify various working sets/logs (128, 129, 130, 131) used by the drop zone allocation tool (120). The components may have combined functionalities and may be implemented as software, hardware, firmware, or combinations thereof.

Figure 2A:
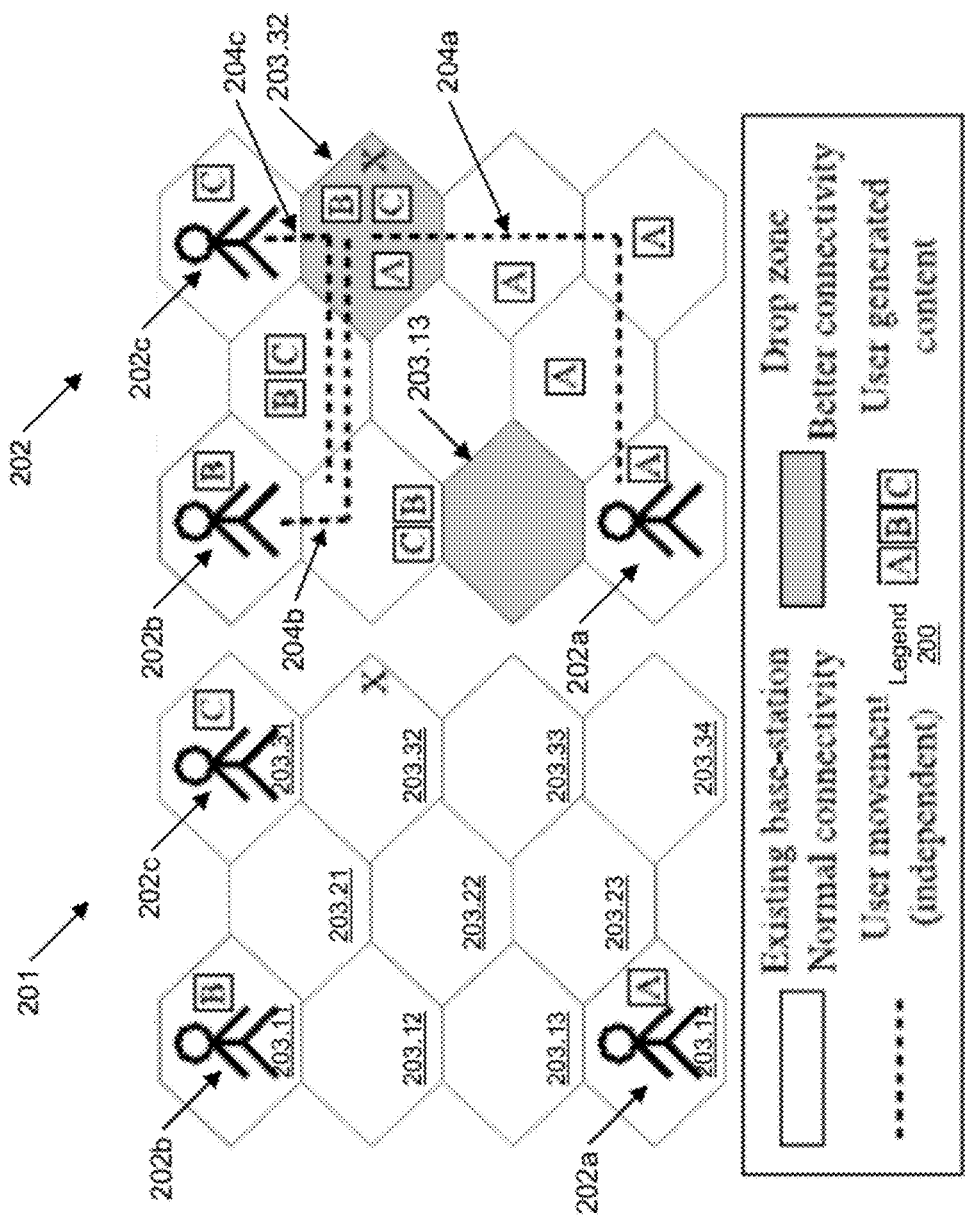
FIGS. 2A and 2D show schematic diagrams of an example mobile communication network according to aspects of the invention.

FIG. 2A shows schematic diagrams of an example mobile communication network according to aspects of the invention. The example mobile communication network may be essentially the same as the mobile communication network (110) described in reference to FIG. 1 above. In one or more embodiments of the invention, the system (100) described in reference to FIG. 1 above may be used to assign drop zones in the example mobile communication network depicted in FIG. 2A. In particular, FIG. 2A shows example scenarios (201) and (202) depicting a same portion of the example mobile communication network including cellular zones (203.11) through (203.34). Each of the cellular zones (203.11) through (203.34) is explicitly labeled in scenario (201) while such labels are omitted in the scenario (202) for clarity except drop zones (203.13) and (203.32), which are explicitly labeled and highlighted as drop zones consistent with the legend (200). In one or more embodiments of the invention, each cellular zone is associated with a base-station. For example, the area serviced by a base-station in the mobile communication network may vary from hundreds of square meters (in densely populated areas) to several square miles (in sparsely populated areas). Throughout this document, the terms "location" and "cellular zone" may be used interchangeably and refer to the area serviced by a particular base-station. Further, the terms "base-station" and "cellular zone" may be used interchangeably depending on the context.

As shown, scenario (201) depicts cellular zones (203.11) through (203.34) as normal connectivity zones corresponding to base-stations using the technology known to those skilled in the art. In particular, users (202a, 202b, 202c) intend to upload data items (A, B, C) using mobile devices in the cellular zones (203.14, 203.11, 203.31), respectively. Example of data items (A, B, C) includes but not limited to text, graphics, photographs, video, user-generated content, public available content, or any other types of document data items. For example, users tend to upload their user-generated content from a small number of locations, which typically correspond to their home or work locations. Accordingly, example cellular zones (203.14, 203.11, 203.31) may include communication coverage of users' home or work locations. In one or more embodiments of the invention, a single indivisible unit of content is defined as content chunk (e.g., of maximum λ bits). Hence, each upload of data items (A, B, C) may consist of several content chunks. In one or more embodiments, one content chunk is delivered (e.g., uploaded) completely from within one cellular zone or location. Throughout this document, a content chunk contained in a network traffic trace or statistical trace containing historical statistics is referred to as a historical content chunk while a content chunk currently being requested for access (e.g., upload or download request from a mobile phone) is referred to as a present content chunk. Further, the term "content chunk" may be used to refer to either historical content chunk or present content chunk depending on the context.

As shown in scenario (202), cellular zones (203.13) and (203.32) are selected as drop zones (i.e., better connectivity zones), which may be configured in many different ways, such as selective deployments of new technologies (e.g., WiMAX, LTE, etc. known to those skilled in the art). Scenario (202) illustrates the difference in user data uploading using the drop zones (203.13) and (203.32). In particular, cellular zones (203.14, 203.11, 203.31) in scenario (201) represent coverage over locations where users (202a, 202b, 202c) may upload data contents with a high probability. Such locations are referred to as user-affine locations (i.e., comfort zones), which typically are the user's home or work locations. On the contrary in scenario (202), although users may request or initiate content upload in the user-affine locations, content transmission does not occur immediately from where the users request or initiate the content upload, but rather occurs in a postponed manner when the users travel within the drop zones (203.13) and (203.32). For example, data items (A, B, C) are uploaded when users (202a, 202b, 202c) travel into the drop zone (203.32) along trajectories (104a, 127b, 127c). Throughout this document, the term "trajectory" refers to mobility pattern of a user. In one or more embodiments, the trajectory may represent user commute path in the format of a sequence of cellular zones (e.g., identified by an identification (ID) of corresponding base stations) and time bin pairs (i.e., pairs of (cellular zone, time bin)) where the cellular zone covers (i.e., provides communication coverage to) the user location during the time bin as the user traverses the commute path. For example, the trajectories (104a, 127b, 127c) may be represented as the sequences of ((203.14, $t_{1a}$), (203.23, $t_{2a}$), (203.34, $t_{3a}$), (203.33, $t_{4a}$), (203.32, $t_{5a}$)), ((203.11, $t_{1b}$)), (203.12, $t_{2b}$), (203.21, $t_{3b}$)), ((203.31, $t_{1c}$), (203.32, $t_{2c}$), (203.21, $t_{3c}$), (203.12, $t_{4c}$)), respectively. Specifically, the time bin sequences ($t_{1a}, t_{2a}, t_{3a}, t_{4a}, t_{5a}$), ($t_{1b}, t_{2b}, t_{3b}$), ($t_{1c}, t_{2c}, t_{3c}, t_{4c}$) may be independent of each other and having different starting and ending time bins while (cellular zone, time bin) pairs in any one of the sequences may be separated by intervening time bins if the user stays in one cellular zone longer than one time bin. For example, time bins $t_{1a}$ and $t_{2a}$ may be separated by zero or more intervening time bins if the user (202a) stays at the cellular zone (203.14) for the duration of one or more time bins.

The cellular zones, content chunks, and user trajectories depicted in FIG. 2A above may be used to describe information relating to current activities in the example mobile communication network thus used as basis for postponing current activity data access requested from user mobile devices (e.g., user mobile devices (113), such as mobile phones). More details are described in reference to FIG. 3A below.

Alternatively, the cellular zones, content chunks, and user trajectories depicted in FIG. 2A above may be used to describe information extracted from a statistical trace and/or network traffic trace captured from the example mobile communication network thus used as basis for determining allocation of drop zones suitable for the historical user data access pattern reflected in the statistical trace. More details are described in reference to TABLE 2, TABLE 3, and FIG. 3B below.

Generally speaking, this better connectivity infrastructure will reduce data communication loading experienced by network infrastructure in normal provisioned regions (i.e., cellular zones (203.11, 203.12 203.14-203.31, 203.33, 203.34) with the exclusion of (203.13) and (203.32)). In one or more embodiments of the invention, the scenario (202) is accomplished by considering the fact that some of the data uploaded or downloaded by users (e.g., users (202a, 202b, 202c)) exhibits a delay tolerant nature. Said in other words, users have some data access needs that need not be serviced immediately but within a certain delay tolerant interval. For example, media (e.g., photographs, video, etc.) contents generated on user devices may not need to be immediately uploaded onto social web sites (e.g., Flickr® (a registered trademark of Yahoo! Inc., Sunnyvale, Calif.), Facebook®

(registered trademark of Facebook Inc., Palo Alto, Calif.), MySpace® (a registered trademark of Myspace, Inc., Beverly Hills, Calif.) etc.) or delivered to the users' friends. By making the assumption that some of these contents are delay tolerant, a portion of such contents can be delivered when better connectivity options are available. In one or more embodiments of the invention, drop zones are placed within the cellular network that fall within the movement patterns of a large number of users within a delay tolerant interval of initial user attempts to access the cellular network for upload or download data items.

Figure 2B:
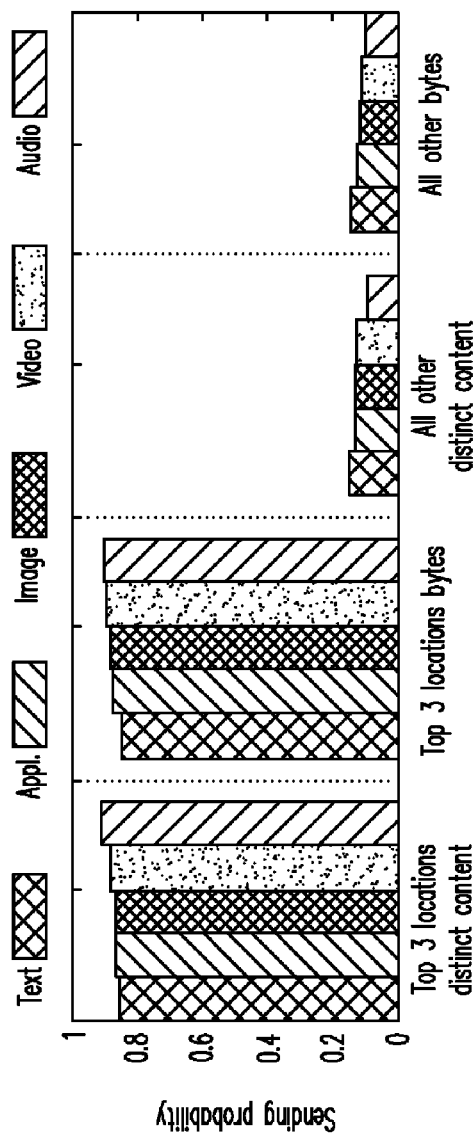
FIGS. 2B and 2C show statistical diagrams of mobile user data usage in an example mobile communication network according to aspects of the invention.

Table 1 and FIG. 2B depict details of historical dataset (e.g., network traffic trace) captured in a cellular network from which users' visit (or travel) locations are extracted to provide insights into user messaging behavior using mobile phones to send and receive Multimedia Messaging Service (MMS) contents to internet services or other users. Specifically, user data in the dataset has been collected over a seven day period from the backbone of one of the popular cellular networks in the U.S. having approximately 2 million users in the network data traffic trace. The statistical trace and/or network traffic trace is collected and anonymized from the content billing system of the data network. Generally speaking, the trace contains attributes (e.g., size, time stamp, sending or receiving location stamp, etc.) of messages exchanged by friends, content uploaded to Facebook®, MySpace®, Flickr®, etc. using mobile phones as well as user locations (even when no messages are accessed) based on geo-locating capability of the mobile phones. In particular, a user location (e.g., in terms of latitude and longitude or other geo-location identifiers) may be correlated with the base-station/cellular zone covering the user location. Accordingly, user trajectories may be extracted from the statistical trace. Throughout this document, Table 1 summarizes the user data uploading statistics extracted from the trace. Various attachment types known to those skilled in the art are used to categorize the messages into five categories in Table 1, namely text (e.g., plain, XML, bookmark, calendar, etc.) application (e.g., word, excel, powerpoint, pdf, rtf, zip, etc.), image (e.g., gif, bmp, jpg, jpeg, png, etc.), audio (e.g., mp3, acc, midi, wma, way, amr, m4a, etc.), and video (e.g., 3gpp, h264, mp4, 3gpp2, etc.). Table 1 shows that average size of a text message is about 60 characters, an audio is about 65 k byte, and the video is about 191 k byte.

TABLE 1

|  | Total [MB] | Nr. messages | Avg. size [bytes] | Max. size [MB] |
| --- | --- | --- | --- | --- |
| Text | 73 | 1,231,411 | 58 | 0.42 |
| Appl. | 826 | 2,193,443 | 376 | 3.5 |
| Image | 77,495 | 2,022,361 | 38,318 | 3.1 |
| Audio | 34,831 | 531,133 | 65,577 | 3.2 |
| Video | 5,998 | 31,345 | 191,339 | 3.5 |

FIG. 2B shows that there exist common locations (e.g., top 3 locations) where users commonly upload contents. Specifically, there are 51,403 locations where users upload/download MMS. Three out of these 41,416 are the top locations for one or more users contributing to 80.57% of the total content uploads. In addition, users prefer to send heavy contents (i.e., large size messages) mostly from their top ranked locations (e.g., top 3 locations).

Figure 2C:
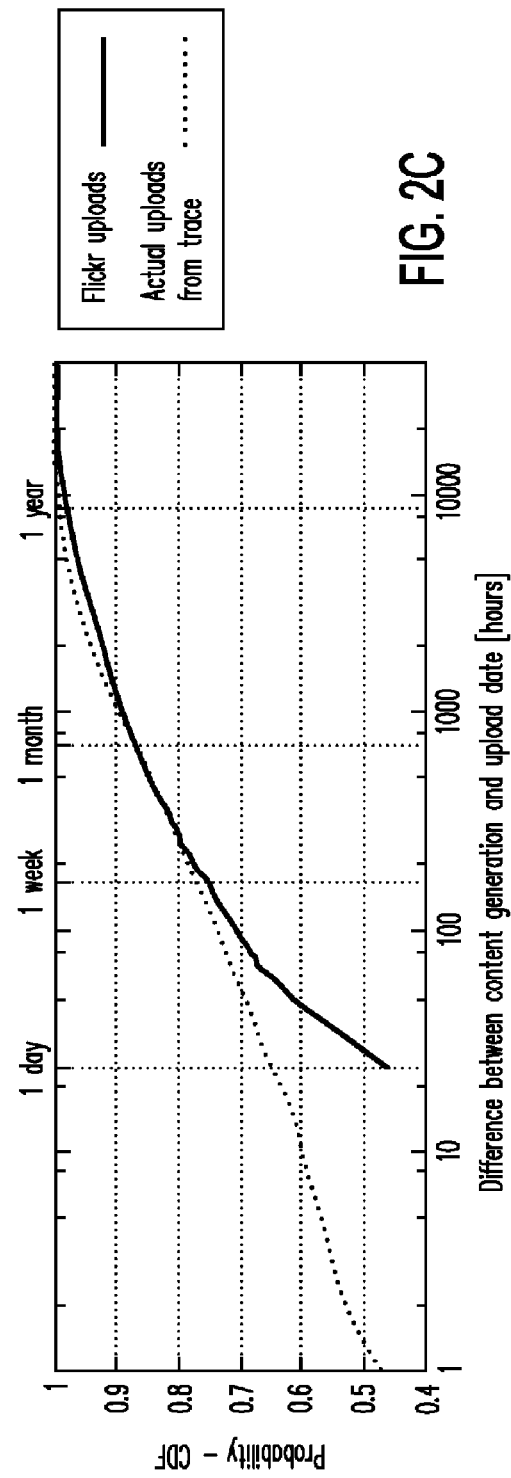

FIG. 2C shows actual delays from content creation and uploading extracted from two sources, namely Flickr® data and data extracted from the aforementioned network traffic trace. Specifically, content creation date/time and upload date/time can be separately identified in the Flickr® data or the network traffic trace and used for calculating the delays. For example, Flickr® data containing 49,054 pictures uploaded over a period of 3 years as obtained by web crawling shows that as much as 55% of content is uploaded with a delay time (measured from photos taken using the mobile phone to photos uploaded using the mobile phone) longer than one day while 25% of content is uploaded with a delay time longer than one week. In addition, the network traffic trace data, relating to diverse user activities (e.g., sending photos to friends as well as uploading them to sites such as Facebook®, MySpace®, Flickr®, etc.) and containing creation time/date information in the file names, shows that 40% of content is uploaded after 10 hours or longer since creation.

In view of the above, users already inherently postpone delivery of their contents after creation as shown in FIG. 2C above. Accordingly in scenario (202) described in FIG. 2A above, users can be given the option to either deliver content immediately upon user request (e.g., while user is in cellular zones (203.11, 203.14, 203.31)) or being asked about how much delivery delay they are willing to tolerate for postponed delivery. In one or more embodiments of the invention, overall content delivery can be improved by network bandwidth upgrade at certain special locations (i.e., drop zones) identified based on historical network traffic trace shown in FIG. 2B above. Some content can be marked as postponed for delivery either automatically or by the user explicit approval and will be delivered only at these locations that have better connectivity, such as cellular zones (203.32) shown in scenario (202) of FIG. 2A above.

Generally speaking in the drop zone placement problem, a certain tolerable delivery delay for all users is assumed for determining a placement. Said in other words, a tolerable delay is pre-determined as a parameter in solving the drop zone placement problem to determine a drop zone placement. In addition, based on users' mobility patterns extracted from the network traffic trace, there exist a set of common locations through which many users pass by at some point in time. In one or more embodiments of the invention, the problem of deciding which existing locations should be provisioned with improved network equipments with better connectivity is addressed as an Integer Linear Programming problem. In one or more embodiments, a greedy algorithm is employed for solving the Integer Linear Programming problem.

The drop zone placement problem can be stated as follows:
Given conditions:
(1) B base-stations and U nomadic (i.e., mobile) users with the associated tempo-spatial mobility patterns describing which base-station is serving each user at any time;
(2) a description of the temporal content generation process for each user describing number of content units being generated by any user at any point in time; and
(3) for all content, a description of the delay $t_j$-$t_i$ that would be encountered by content generated by a user at time $t_i$ and delivered at time $t_j$.

Goal of the solution is to find the minimum number of drop zone bandwidth upgrade equipment to be co-located at selected base-stations, such as to satisfy the constraints below:
(1) the number of content units that a drop zone can deliver at a point in time is less than a maximum capacity, (in terms of aggregated rate across users); and
(2) the delay between original and postponed delivery for any content in the system is less than a maximum tolerable delay. In this context, the term "original" refers to the historical delivery in the network traffic trace and the term "postponed" refers to the modeled delivery as an alternative to the original delivery in the network traffic trace. Accordingly, a solution (e.g., a drop zone allocation) to the drop zone placement problem is evaluated based on differences in modeled network resources and modeled user experienced delays such that an optimized placement (e.g., minimum number of drop zones) can be found that meets the given constraints.

For purposes of setting forth a non-limiting example solution of the drop zone placement problem formulated above, a one week long trace from one of the largest cellular service providers in North America is used for analyzing user data uploading activities. The trace provides information regarding users' trajectories (i.e., movement pattern) in terms of locations (i.e., base-stations) and time that they were present as well as users' activity, such as uploading or downloading content at a certain time. For example, if a user was uploading content, then the trace also provides size and type of the content (video, audio, image, text) being uploaded. Generally speaking, the trace data may be in the format of tuple "time, location, content" per user. In one or more embodiments, content uploaded by a user and the user's trajectory may be extracted separately from the trace for analysis to allocate the drop zone (i.e., determining the cellular zones to be configured with upgraded bandwidth where users can upload content advantageously).

In one or more embodiments, a single indivisible unit of content is defined as content chunk of maximum $\lambda$ bits. Hence, each upload of content may consist of several content chunks. It is assumed that any solution must ensure that one content chunk is delivered completely from within one location. Furthermore, in the solution, it is allowed for content chunks to be uploaded in parallel and out of order. Said in other words, it is assumed that uploaded content chunks will be reordered by an application layer.

In one or more embodiments, time is divided into discrete units (i.e., bins) of length $\tau$ seconds each, and the entire trace is represented as a set of bins $T=\{t_1, t_2, \ldots, t_T\}$ where a user's trajectory that straddles across two time bins is modified such that it begins at the beginning of the first time bin and ends at end of the second time bin. Specifically, $T=\{t_1, t_2, \ldots, t_T\}$ represents the sequence of temporal snapshots at which the network traffic trace is captured. In one or more embodiments, the captured network traffic trace may be formatted into statistical trace using the same time bins. In one or more embodiments, the captured network traffic trace may be formatted into statistical trace using the different time bins based on interpolation. For purposes of setting forth a non-limiting example solution of the drop zone placement problem, let C be the set of content chunks in the statistical trace or a portion thereof and |C| represents the number of content chunks belonging to C while $c \in C$ denotes a content chunk and |c| represents the size of a content chunk in bits. Let $\Delta_c^i$ represent the number of content bits generated by the user for content chunk $c \in C$ at time $t_i \in T$. Let B be the set of base-stations in an example mobile communication network or a portion thereof. Let $R_c^{ij}$ be the delay for content chunk $c \in C$ generated at time $t_i \in T$ and delivered at time $t_j \in T$ with $t_i \leq t_j$. Let $\zeta_b^{max}$ be the maximum number of content bits that can be uploaded at the drop zone placed at base-station $b \in B$ within any time bin, and $D^{max}$ be the maximum delay allowed for any content chunk to be uploaded since its generation. Furthermore, let $n_c^i \in \{0, 1\}$ indicate whether content chunk $c \in C$ was generated at time $t_i$ (i.e., $n_c^i = 1$) or not (i.e., $n_c^i = 0$). Similarly, let $m_c^{jb} \in \{0, 1\}$ indicate whether user u corresponding to content chunk $c \in C$ is covered by base-station $b \in B$ at time $t_j$ (i.e., $m_c^{jb} = 1$) or not (i.e., $m_c^{jb} = 0$). The user u is said to be covered by the base-station b if the user location is within the cellular zone coverage of the base-station b.

The use of variables defined above may be illustrated via an example. Suppose from the statistical trace as an input to the drop zone placement problem, information regarding a user who uploads a content of 10 Kb within a session over which the user was present at base-station $B_1$. Let the maximum content chunk size $\lambda=10$ Kb, time bins of $\tau=1$ minute, maximum capacity at any drop zone, $\zeta_b^{max}=100$ Kbps, $\forall b \in B$, and maximum tolerable delay $D^{max}=5$ minutes. Let the binned trajectory for the user be $\{B_1, 0, 0, B_2, 0, B_3, B_3, 0\}$ over $T=\{t_1, t_2, \ldots, t_8\}$ where 0 represents unknown location. Alternatively, this trajectory may be represented as (base-station, time bin) pairs of $\{(B_1, t_1), (0, t_2), (0, t_3), (B_2, t_4), (0, t_5), (B_3, t_6), (B_3, t_7), (0, t_8)\}$. For purposes of setting forth a non-limiting example solution, the content generation time for the content chunk c1 is assumed to be the beginning of time bin $t_1$. Hence, $\Delta_{c1}^i = \{10, 0, 0, 0, 0, 0, 0, 0\}$ over $t_i \in T$. The variable $R_{c1}^{1j}$ represents delay encountered by content c1 generated at $t_1$ and delivered at time $t_j \in T$ and is given as $R_{c1}^{1j} = \{0, 1, 2, 3, 4, 5, \infty, \infty\}$. In one or more embodiments, this variable $R_{c1}^{1j}$ is used to compute the time delay regardless of whether user's presence is known or not at the time, for example at time $t_5$, the value is 4. User u is known to have been in location $B_3$ at time bins $t_6$, $t_7$ as well. However, the content can be delivered in $B_3$ at time $t_6$ only and not at $t_7$ since that would violate the maximum tolerable delay constraint of 5 minutes. Hence, the value $\infty$ is assigned at time $t_7$ as well as $t_8$. Finally, $n_{c1}^i = \{1, 0, 0, 0, 0, 0, 0, 0\}$, $m_c^{jB1} = \{1, 0, 0, 0, 0, 0, 0, 0\}$, $m_{c1}^{jB2} = \{0, 0, 0, 1, 0, 0, 0, 0\}$, $m_{c1}^{jB3} = \{0, 0, 0, 0, 0, 1, 1, 0\}$, over T.

As described in the problem formulation above, the objective is to place the minimum number of drop zones that would cover all historical content chunks in a statistical trace based on delivery postponement within a pre-determined tolerable delay. As noted above and will be described in example applications in reference to FIG. 4 below, the pre-determined tolerable delay is a parameter for each solution of the problem formulation above. Said in other words, each historical content chunk in the statistical trace my be alternatively scheduled (or designated) for access (i.e., delivery, such as upload or download) at a postponed time bin at a drop zone intersecting a user trajectory. Throughout this document, a time bin and/or cellular zone (e.g., drop zone) is said to intersect a trajectory, and vice versa, if the trajectory includes the cellular zone and the time bin pair. In one or more embodiments, the problem formulated above is mapped to a time based set covering problem based on user trajectory (i.e., mobility pattern) statistics and pre-determined constraints including tolerable delivery delay and maximum capacity. Specifically, for a given set of contents (i.e., content universe set), and a given set of base-stations, a minimum number of base-stations are identified that cover the entire content universe set. For each content chunk uploaded at a base-station in the statistical trace, the postponed delivery model substitutes the original upload by an upload request that stays with the user mobile device and travels with the user, until the postponed delivery occurs in the model, along a trajectory recorded in the statistical trace. When the trajectory intersects a base-station subsequent to the request but prior to the postponed delivery, the content chunk is referred to as being covered by the base-station and the base-station is referred to as having the content chunk while the user is within the corresponding cellular zone. In one or more embodiments, when the content chunk is covered by a base-station, it is considered that the content chunk has an opportunity to be uploaded using the base-station. Further, if the content chunk is not uploaded (i.e., delivered) at the particular base-station, it is considered that the content chunk has future opportunities to be uploaded at other base-stations downstream to the particular base-station in the trajectory for so long as at least one such downstream base-station has unused capacity and is intersected by the trajectory within the tolerable delay from the time bin of original upload in the statistical trace.

Based on the variable definitions set forth above, the drop zone placement problem can be formulated for a given statistical trace by introducing two binary variables: $x_b$ and $\delta_u^{ij}$. The variable $x_b \in \{0, 1\}$ describes whether a base station b is selected as a drop zone (i.e., $x_b=1$) or not (i.e., $x_b=0$). The variable $\delta_u^{ij} \in \{0, 1\}$ describes whether any content chunk generated by user $u \in U$ at time $t_i \in T$ is delivered (i.e., scheduled postponed delivery in a model) at time $t_j \in T$ with $t_i = < t_j$ (i.e., $\delta_u^{ij}=1$) or not (i.e., $\delta_u^{ij}=0$). Accordingly, the drop zone placement problem for a given statistical trace is formulated as minimizing $$\sum_{b \in B} x_b$$

while observing the constraints listed in TABLE 2 below.

TABLE 2

Drop Zone Placement:

$$x_b \leq \sum_{c \in C} \sum_{i,j \in T: i \leq j} \delta_c^{ij} m_c^{jb} \forall b \in B \quad (1)$$

$$x_b \geq \delta_c^{ij} m_c^{jb} \forall b \in B, \forall c \in C, \forall i, j \in T: i \leq j \quad (2)$$

Content Delivery (No Splitting):

$$\delta_c^{ij} \leq n_c^i \forall c \in C, \forall i, j \in T: i \leq j \quad (3)$$

$$\sum_{j \in T: j \geq i} \delta_c^{ij} = n_c^i \forall c \in C, \forall i \in T \quad (4)$$

Drop Zone Capacity:

$$\sum_{c \in C} \sum_{i \in T: i \leq j} \delta_c^{ij} m_c^{jb} \Delta_c^i \leq \zeta_b^{max} \forall b \in B, \forall j \in T \quad (5)$$

Maximum Delay Allowed:

$$\delta_c^{ij} R_c^{ij} \leq D^{max} \forall c \in C, \forall i, j \in T: i \leq j \quad (6)$$

For purposes of setting forth a non-limiting example solution of the drop zone placement problem formulated above, an example "greedy algorithm" is illustrated below where S is the number of distinct content chunks covered by the base-station that covers the maximum number of distinct content chunks and H(s) is the corresponding Harmonic number given as: $H(s) = \sum_{k=1}^{s} 1/k \leq \ln(s)$.

The example greedy algorithm depicted in TABLE 3 below is iterative and determines in each iteration which base-stations should be considered for placing drop zones and repeats the iteration loop until all historical content chunks in the statistical trace are covered by at least one drop zone. For example, the statistical trace may be obtained from a mobile communication network using the statistical trace manager (126) and the application interface (121) described in reference to FIG. 1 above. At each iterative step, the greedy algorithm selects the base-station that has the maximum trajectory based content count (TBCC), which is a number of distinct content chunks the base-station has that have not been covered yet. In one or more embodiments, the greedy algorithm assigns priority to each uncovered content chunk at a particular base-station and a particular time bin in terms of how many future chances a content chunk may still be covered (if not delivered at the particular base-station and the particular time bin) considering a corresponding user trajectory.

More precisely, the priority of each uncovered content chunk at a particular base-station and particular time bin is computed as tolerable delay allocated capacity (TDAC). In one or more embodiments, TDAC is calculated as an aggregate of unused capacity of all base-stations along a trajectory of the user corresponding to this content over time bins starting from the particular time bin until the maximum tolerable delay later. In one or more embodiments, TDAC is calculated as an aggregate of unused capacity of the particular base-station in a trajectory of the user corresponding to this content over time bins starting from the particular time bin until the maximum tolerable delay later (see Function 2 described in TABLE 3 below). Those skilled in the art, with the benefit of this disclosure, will appreciate other specific formulations of the TDAC may be devised that are applicable to represent future chances a content chunk may still be covered (if not delivered at the particular base-station and the particular time bin) considering a corresponding user trajectory.

TABLE 3

Initialize X = { }, where X is set of base-stations selected as drop zones.
Create C = Set of content chunks in the system not yet covered over all $t_i \in T$.
Create B = Set of base-stations having at least one content chunk ($c \in C$) not yet covered at any time.
Create $\zeta(b, t_i)$ = Unused capacity at base-station b at time bin $t_i$. At any time, $\zeta(b, t_i) \leq \zeta_b^{max}$.
while |C| > 0 do
  b = RankBaseStations(B);
  X = X ∪ b;
  RC = RankContent-AT-BaseStation(C, b);
  for (c, b) in RC do
    $t_h$ = DeliverContent (c, b);
    if $T_h$ < > −1 then
      $\zeta(b, t_h) = \zeta(b, t_h) - |c|$;
      C = C − c;
      RC = RankContent-AT-BaseStation (C, b);
    end if
  end for
  create B;
end while For example, the sets X, C, B, and the unused capacity $\zeta(b, t_i)$ may correspond to the working set of drop zones (128), working set of content chunks (129), working set of base-stations (130), and unused capacity log (131) described in reference to FIG. 1 above. Further, the functions RankBaseStations(B), RankContent-AT-BaseStation(C, b), and DeliverContent (c, b) may correspond to the rank base-stations module (123), rank content at base-stations module (124), and deliver content module (125) described in reference to FIG. 1 above.

Continuing the discussion of TABLE 1, the function RankBaseStations(B) assigns priority to base-stations b∈B by counting the maximum number of distinct content chunks not yet covered using the greedy algorithm, that can be served by each base-station b over all of time bins $t_i \in T$ during which the users traverse respective trajectories. This count is referred to as trajectory based content count (TBCC) for each base-station b∈B. These base-stations are then sorted in ascending order of the TBCC and the function RankBaseStations(B) returns the base-station with largest TBCC.

The function RankContent-AT-BaseStation(C, b) assigns priority to each content chunk c∈C served by base-station b by counting the number of capacity units that content chunk c will have at base-station b within the maximum tolerable delay $D^{max}$ from the time $t_i$ when the content was originally uploaded. This count is referred to as tolerable delay allocated capacity (TDAC). Then these pairs $(C_i, TDAC_i)$ of content chunks with associated TDACs are sorted in ascending order of TDACs to generate a sorted list RC, with the most critical pair (i.e., the pair having lowest tolerable delay allocated capacity) as the first one to be delivered (i.e., postponed delivery in the model).

The function DeliverContent (c, b) delivers (i.e., replacing the original delivery in the statistical trace by this modeled postponed delivery) the content c at base-station b by selecting the earliest time bin $t_h \in [t_i, t_i+D^{max}]$ at which $\zeta(b, t_h) > 0$. Then it returns the time bin $t_h$. It returns $t_h = -1$, in case no time bin is available.

Figure 2D:
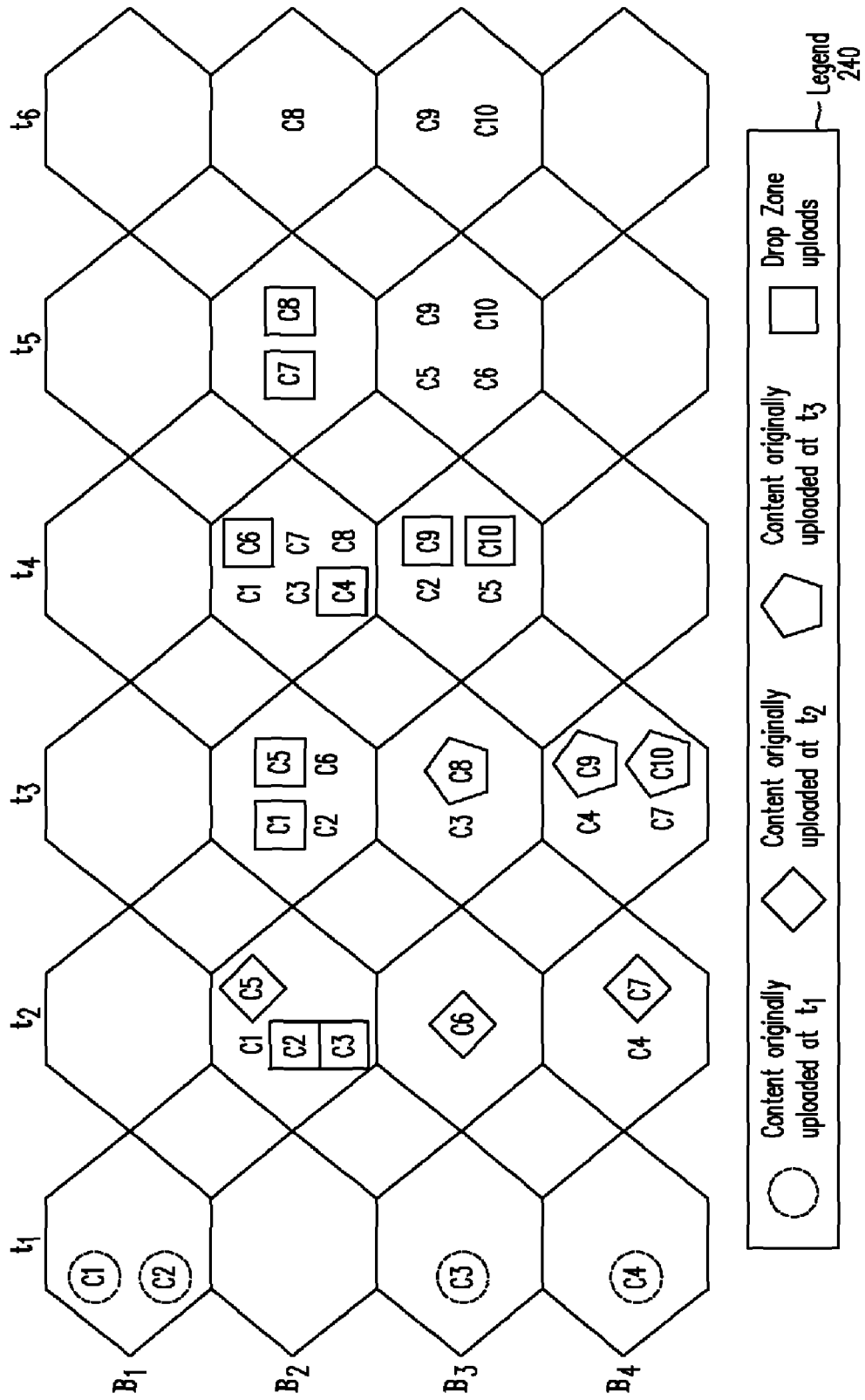

FIG. 2D illustrates an example placement of drop zones using the example greedy algorithm described above. For purposes of setting forth a non-limiting example solution of the drop zone placement problem, base-stations $B_1$, $B_2$, $B_3$, and $B_4$ are shown as part of an example mobile communication network where each base-station provides communication coverage within a hexagonal shaped cellular zone. Content chunks covered by these base-stations are shown for six time bins, namely, $t_1, t_2, t_3, t_4, t_5,$ and $t_6$. The example depicted in FIG. 2D compares an original content upload pattern (as identified by the circle, diamond, pentagon shaped icons according to legend 240) to modeled postponed content upload pattern using drop zones allocated based on the example greedy algorithm described above.

For purposes of setting forth a non-limiting example solution of the drop zone placement problem, let the set of base-stations B={$B_1, B_2, B_3, B_4$}. Assume time bins of length $\tau=1$ second for T={$t_1, t_2, \ldots, t_6$} and minimum content chunk size $\lambda=1$ unit for each content chunk $c_i \in C = \{c_1, c_2, \ldots, c_{10}\}$. Further, assume maximum capacity at any drop zone is 2 units per time bin and maximum tolerable delay to deliver any content chunk since original upload time is $D^{max}=3$ time bins (i.e., 3 seconds). Initialize the unused capacity at each base-station b∈B for each time bin $t_i \in T$ as $\zeta(b, t_i)=2$. Assume the following original content upload pattern in the statistical trace as below:

(1) {$c_1, c_2, c_3, c_4$} were uploaded in time bin $t_1$;
(2) {$c_5, c_6, c_7$} were uploaded in time bin $t_2$; and
(3) {$c_8, c_9, c_{10}$} were uploaded in time bin $t_3$. Note that subscripts for the content chunks $c_1$ through $c_{10}$ are substituted with regular text font in FIG. 2D for clarity. For purposes of setting forth a non-limiting example solution of the drop zone placement problem, all content chunks are assumed to be of the same size of 1 unit.

Moreover, the user movements are assumed to be the following trajectories extracted from the statistical trace:

(1) $(B_1, t_1)$, $(B_2, t_2)$, $(B_2, t_3)$, $(B_2, t_4)$ for the user corresponding to content chunk $c_1$;
(2) $(B_2, t_2)$, $(B_2, t_3)$, $(B_3, t_4)$ for the user corresponding to content chunk $c_2$;
(3) $(B_3, t_1)$, $(B_2, t_2)$, $(B_3, t_3)$, $(B_2, t_4)$ for the user corresponding to content chunk $c_3$;
(4) $(B_4, t_1)$, $(B_4, t_2)$, $(B_4, t_3)$, $(B_2, t_4)$ for the user corresponding to content chunk $c_4$;
(5) $(B_2, t_2)$, $(B_2, t_3)$, $(B_3, t_4)$, $(B_3, t_5)$ for the user corresponding to content chunk $c_5$;
(6) $(B_3, t_2)$, $(B_2, t_3)$, $(B_2, t_4)$, $(B_3, t_5)$ for the user corresponding to content chunk $c_6$;
(7) $(B_4, t_2)$, $(B_4, t_3)$, $(B_2, t_4)$, $(B_2, t_5)$ for the user corresponding to content chunk $c_7$;
(8) $(B_3, t_3)$, $(B_2, t_4)$, $(B_2, t_5)$, $(B_2, t_6)$ for the user corresponding to content chunk $c_8$;
(9) $(B_4, t_3)$, $(B_3, t_4)$, $(B_3, t_5)$, $(B_3, t_6)$ for the user corresponding to content chunk $c_9$; and
(10) $(B_4, t_3)$, $(B_3, t_4)$, $(B_3, t_5)$, $(B_3, t_6)$ for the user corresponding to content chunk $c_{10}$.

Note that the content chunks that were originally uploaded at time $t_1, t_2, t_3$ are shown as circles, diamonds, and pentagons, respectively. Content chunks that may be postponed for delivery within a cellular zone by virtue of user's movement therein are shown without circles, diamonds, and pentagons. Hence, note that while the user corresponding to content $c_1$ did not upload any new content at time bins $t_2, t_3, t_4$, cellular zone $B_2$ intersected by the user trajectory at these time bins are alternate candidates for postponed upload of content chunk $c_1$ shown in $t_2, t_3,$ and $t_4$ without circles, diamonds, and pentagons. The final selection from these alternate candidates for postponed upload of content chunk $c_1$ based on drop zone allocation using the greedy algorithm is as shown as content chunk $c_1$ enclosed in squares within cellular zone $t_3$. Content chunk $c_1$ is said to be "covered" (i.e., scheduled/assigned for postponed delivery at a designated base-station) in the example shown in FIG. 2D based on the square box designation in $(B_2, t_3)$. Similar annotation schemes are also applied to content chunks $c_2$ through $c_{10}$.

For purposes of setting forth a non-limiting example solution of the drop zone placement problem described above, the greedy algorithm described in TABLE 3 initializes with X={ }, C={$c_1, \ldots, c_{10}$} and B={$B_1, B_2, B_3, B_4$}. At the first Iteration of the "while" loop, |C|=10 (i.e., |C|>0) and hence, RankBaseStations(B) is evaluated to obtain (base-station, TBCC) pairs of {$(B_1, 2), (B_2, 8), (B_3, 7), (B_4, 4)$} and output b=$B_2$ and X={$B_2$}. In particular, the number of distinct content chunks not yet covered (i.e., scheduled/assigned for postponed delivery at a designated base-station) by the greedy algorithm, that can be served by base-station $B_2$ over time bins $t_1$ through $t_6$ during which the users traverse respective trajectories described above is counted to be 8, specifically $c_1$ (in any of $t_2, t_3, t_4$), $c_2$ (in any of $t_2, t_3$), $c_3$ (in any of $t_2, t_4$), $c_4$ (in any of $t_4$), $c_5$ (in any of $t_2, t_3$), $c_6$ (in any of $t_3, t_4$), $c_7$ (in any of $t_4, t_5$), and $c_8$ (in any of $t_4, t_5$).

Continuing with the greedy algorithm to RankContent-AT-BaseStation(C, $B_2$), which produces the following initial set of priorities for users at $B_2$ as (content chunk, TDAC) pairs of {$(c_1, 6), (c_2, 4), (c_3, 4), (c_4, 2), (c_5, 4), (c_6, 4), (c_7, 4), (c_8, 6)$}. For example at base-station $B_2$, the number of capacity units that content chunk $c_1$ will have within maximum tolerable delay of 3 time bins from the time bin $t_2$ when $c_1$ was originally uploaded in the statistical trace (i.e., within [$t_2, t_3, t_4, t_5$]) is counted as 2 units*3 time bins (i.e., time bins $t_3, t_4, t_5$), which is 6 for the (content chunk, TDAC) pair $(c_1, 6)$ in the initial set of priorities for users at $B_2$ above. Accordingly, the initial set of priorities is sorted into the list RC={$(c_4, 2), (c_2, 4), (c_3, 4), (c_5, 4), (c_6, 4), (c_7, 4), (c_1, 6), (c_8, 6)$}. Hence, first content that is selected in the "for" loop is $(c_4, 2)$ that is then delivered at time $t_4$ as determined by DeliverContent $(c_4, B_2)$. Next, unused capacity is reduced from the initial 2 units by one to obtain $\zeta(B_2, t_4)=1$, and the set of content chunks not yet covered is modified as C=C−$c_4$. Next, RankContent-AT-BaseStation(C, $B_2$) is reevaluated to produce the following adjusted priorities amongst users at $B_2$ as (content chunk, TDAC) pairs of {$(c_1, 5), (c_2, 4), (c_3, 3), (c_5, 4), (c_6, 3), (c_7, 3), (c_8, 5)$} and sorted as adjusted/updated RC={$(c_3, 3), ($c_6$, 3), ($c_7$, 3), ($c_2$, 4), ($c_5$, 4), ($c_1$, 5), ($c_8$, 5)} ending the first iteration of the "for" loop. Continuing to the next iteration of the "for" loop, the next content to be selected is ($c_3$, 3), that is then delivered at $B_2$ at time $t_2$. Thus, the unused capacity at $B_2$ at time $t_2$ is reduced by one unit to result in $\zeta(B_2, t_2)$=1, and C=C-$c_3$ is updated ending the second iteration of the "for" loop. Continuing these iterations of the "for" loop will produce the following final allocation of content deliveries at $B_2$ in the tuple format (content chunk, base-station identified for delivery, time bin identified for delivery) of ($c_4$, $B_2$, $t_4$), ($c_3$, $B_2$, $t_3$), ($c_2$, $B_2$, $t_2$), ($c_5$, $B_2$, $t_3$), ($c_1$, $B_2$, $t_3$), ($c_6$, $B_2$, $t_4$), ($c_7$, $B_2$, $t_5$), ($c_8$, $B_2$, $t_5$). The "for" loop in the greedy algorithm is then exit with C={$c_9$, $c_{10}$}, and B={$B_3$, $B_4$}.

Continuing the greedy algorithm with |C|=2>0, hence the "while" loop is entered. Similar to the initial "while" loop iteration described above, RankBaseStations(B) produces the following base-station/TBCC pairs of {($B_3$, 2), ($B_4$, 2)}, and since both base-stations are of equal priority, the example algorithm randomly chooses b=$B_3$ hence output X={$B_2$, $B_3$}. Finally, RankContent-AT-BaseStation(C, $B_3$) produces the following set of priorities for users at $B_3$ as content chunk/ TDAC pairs of {($c_9$, 6), ($c_{10}$, 6)} and the resultant allocation of content delivery at $B_3$: ($c_9$, $B_3$, $t_4$), ($c_{10}$, $B_3$, $t_4$). At this point, the entire set of content chunks is fully covered and allocated for delivery using the greedy algorithm with selected base-stations X={$B_2$, $B_3$} as drop zones. In one or more embodiments, the base-stations selected as drop zones are upgraded with increased bandwidth capacity.

Although particular number and geometry of cellular zones in the example mobile communication network and particular number of users, user trajectories, and user data access pattern in the historical network traffic trace are described in the example above, those skilled in the art with the benefit of this disclosure, will appreciate that any number or geometry of cellular zones and/or any number of users, types of user trajectories and user data access (uploading or downloading) may be included without deviating from the invention.

Figure 3A:
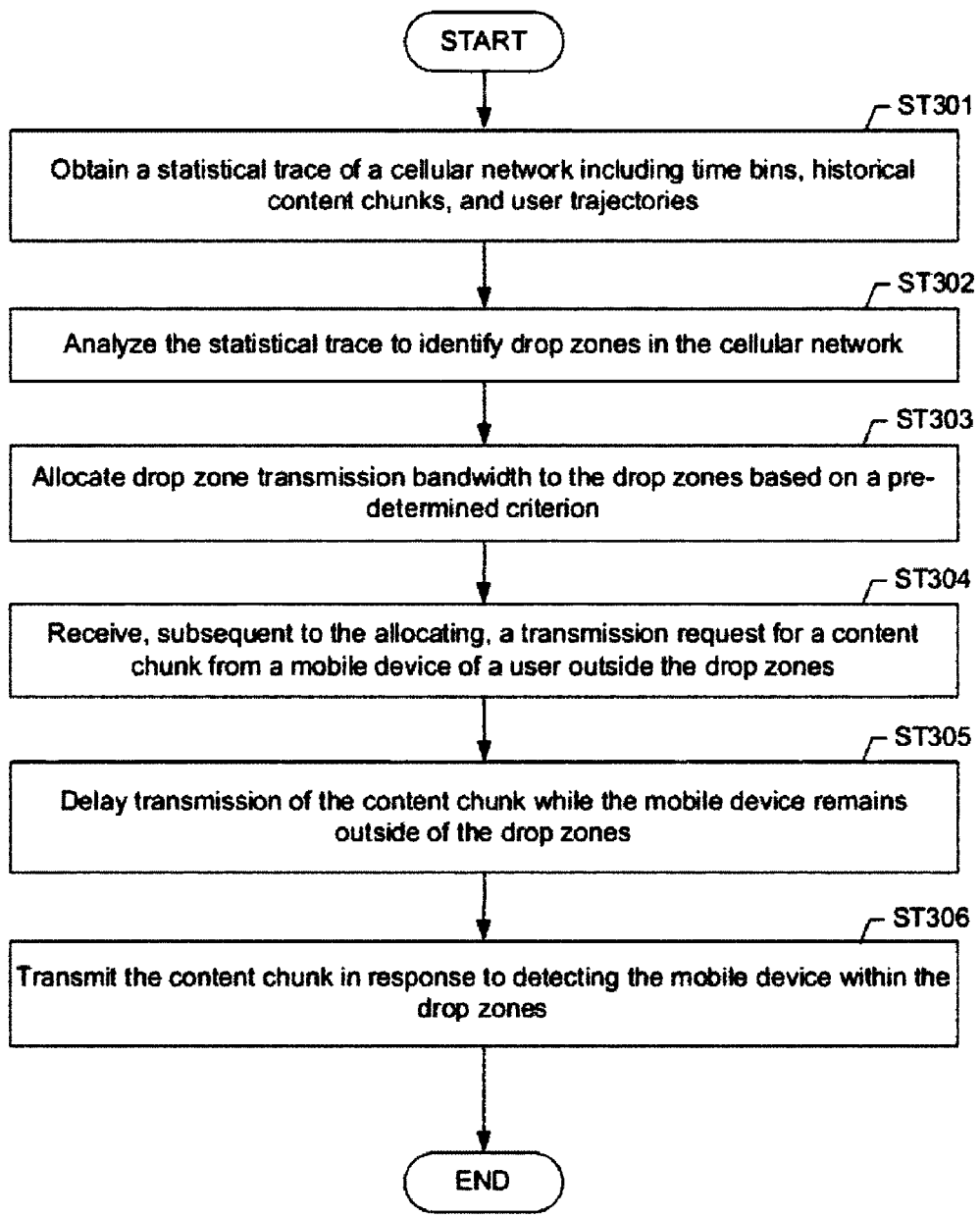
FIGS. 3A and 3B show method flow charts according to aspects of the invention.
Figure 3B:
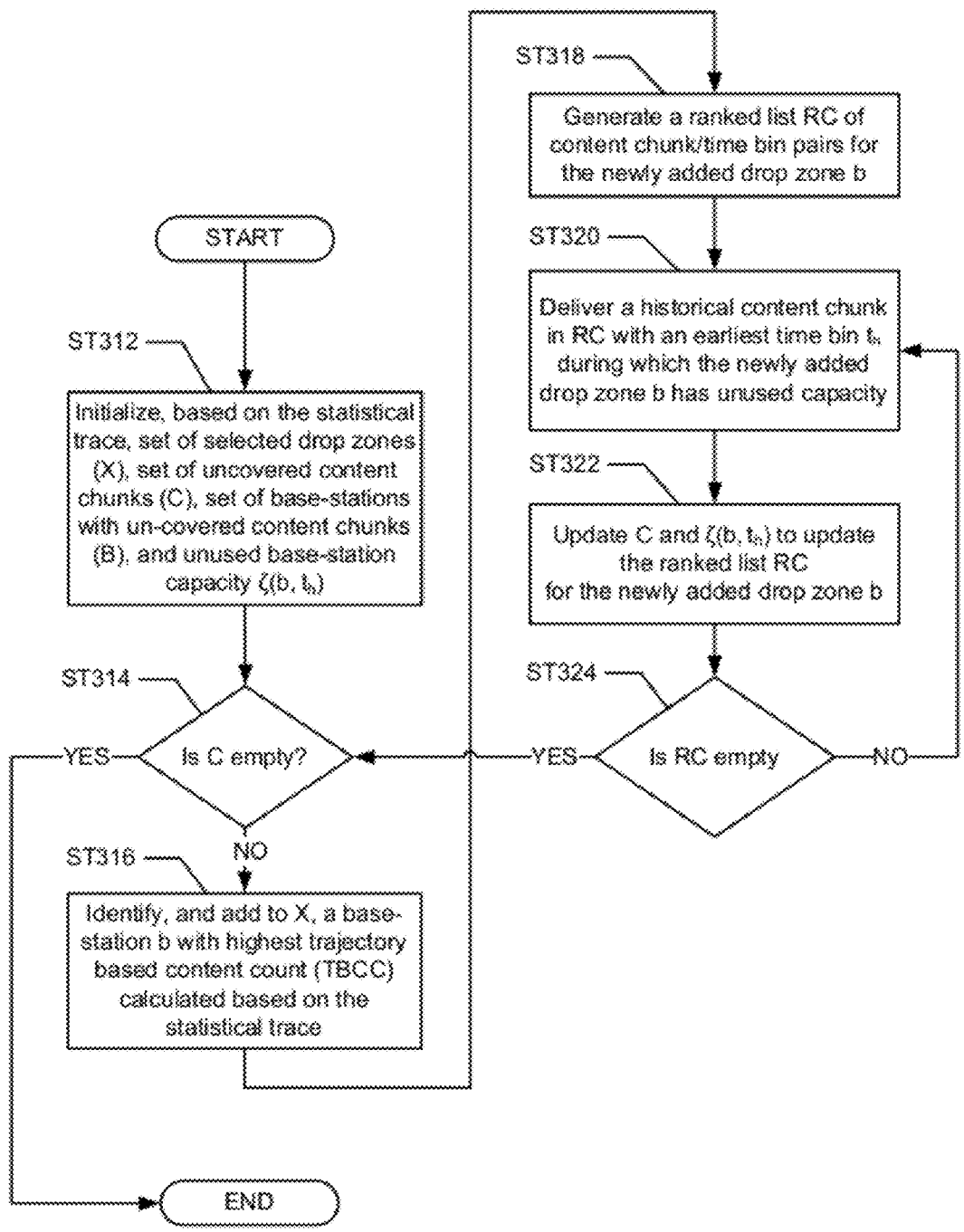

FIGS. 3A and 3B depict flowcharts of methods in accordance with one or more embodiments of the invention. In one or more embodiments of the invention, one or more of the steps shown in FIGS. 3A and 3B may be omitted, repeated, and/or performed in a different order. Accordingly, embodiments of the invention should not be considered limited to the specific arrangements of steps shown in FIGS. 3A and 3B. In one or more embodiments of the invention, the method depicted in FIGS. 3A and 3B may be practiced using system (100) described with respect to FIG. 1 above. As noted above, the system (100) may include a cellular network having cellular zones of which examples are described in reference to FIGS. 2A-2D above.

FIG. 3A shows a method of delaying transmission of content chunks from user mobile device using drop zones within a mobile communication network where the drop zones are allocated based on analysis of a historical statistical network traffic trace. Initially in ST301, a statistical trace associated with the cellular network is obtained. For example, a network traffic trace may be captured in a mobile communication network by a provider thereof. The network traffic trace may then be formatted within a drop zone allocation tool into a particular format as the statistical trace. In one or more embodiments of the invention, the statistical trace includes attributes (e.g., size, time stamp, location stamp, etc.) of historical content chunks received from prior users of the cellular network and trajectories of the prior users moving within the cellular zones of the cellular network. In one or more embodiments, the attributes of the historical content chunks are indexed by the cellular zones. For example, the location stamps may be in terms of latitude and longitude or other geo-location identifiers that may be correlated to the cellular zone ID and/or base-station ID. As described in reference to FIGS. 2A and 2D above, the trajectory may include a sequence of (cellular zone, time bin) pair or (base-station, time bin) pairs. In one or more embodiments, the statistical trace may be obtained for a period of time considered as having representative data usage pattern that is pertinent to current network bandwidth allocation. In one or more embodiments, the statistical trace is obtained for analysis to determine an allocation of drop zones in the cellular network where upgraded bandwidth is allocated, for example by equipment upgrades.

In ST302, the statistical trace is analyzed to identify a portion of the cellular zones as drop zones. In one or more embodiments of the invention, the analysis of the statistical trace to identify the drop zones is formulated in an Integer Linear Programming formulation described in reference to TABLE 2 above where a pre-determined objective function defined as $$\sum_{b \in B} x_b$$

is minimized while observing the constraints represented by equations (1)-(6) of TABLE 2. In one or more embodiments, the aforementioned Integer Linear Programming formulation is solved using a greedy algorithm described in reference to TABLE 2 above and FIG. 3B below.

In one or more embodiments, identifying the drop zones includes determining a cellular zone ranking according to a trajectory based content count (TBCC) calculated for each of cellular zones based on the statistical trace and identifying the drop zones from the cellular zones based on the cellular zone ranking.

In one or more embodiments, determining the cellular zone ranking includes identifying time bins in the statistical trace, identifying trajectories intersecting a cellular zone for each of the time bins, calculating the TBCC of the cellular zone by tallying historical content chunks accessed along the trajectories intersecting the cellular zone over each of the time bins, where the historical content chunks are accessed preceding the cellular zone in each of the trajectories intersecting the cellular zone.

In one or more embodiments, identifying the drop zones includes determining a historical content chunk ranking within the cellular zone according to a tolerable delay allocated capacity (TDAC) calculated for each historical content chunk covered by the cellular zone and identifying the drop zones from the cellular zones based on the historical content chunk ranking.

In one or more embodiments, determining the historical content chunk ranking within the cellular zone includes identifying a portion of the time bins within a pre-determined tolerable delay period from a time bin during which a historical content chunk is accessed preceding the cellular zone in a trajectory intersecting the cellular zone, where the historical content chunk is covered by the cellular zone during the portion of the time bins and calculating the TDAC of the historical content chunk within the cellular zone by tallying available capacities of the cellular zone during each of the time bins, where the available capacity of the cellular zone is adjusted in response to postponed delivery of a previously identified historical content chunk from the cellular zone.

In one or more embodiments, identifying the drop zones includes iteratively determining a cellular zone ranking according to a trajectory based content count (TBCC) calculated for each of the cellular zones based on the statistical trace, iteratively determining a historical content chunk ranking within each cellular zones according to a tolerable delay allocated capacity (TDAC) calculated for each historical content chunk covered by each of the cellular zones, and identifying the drop zones from the cellular zones based on the cellular zone ranking and the historical content chunk ranking, where iteratively determining the cellular zone ranking includes iteratively adjusting the cellular zone ranking based on the historical content chunk ranking.

In ST303, drop zone transmission bandwidth is allocated to the drop zones based on a pre-determined criterion. In one or more embodiments of the invention, the aforementioned greedy algorithm is applied with a pre-determined base-station capacity. Accordingly, the base-stations identified by the greedy algorithm as drop zones may be allocated with drop zone transmission bandwidth consistent with such pre-determined base-station capacity. In one or more embodiments, the pre-determined criterion may include a designation of time period in the statistical trace of which the historical network data usage pattern is considered pertinent to the present network user activities. In one or more embodiments, the pre-determined criterion may allow different levels of drop zone transmission bandwidths to be allocated to different classes of drop zones. In one or more embodiments, the pre-determined criterion may be static where the relevant time period in the statistical trace is designated once and/or different levels of drop zone transmission bandwidths are allocated to different classes of drop zones once. In one or more embodiments, the pre-determined criterion may be dynamic where the designation of relevant time period in the statistical trace and/or allocating different levels of drop zone transmission bandwidths to different classes of drop zones may be performed as needed based on the present network user activities.

In ST304, subsequent to the allocating step in ST303, a transmission request for a content chunk is received from a mobile device of a user outside the drop zones. In one or more embodiments of the invention, the transmission includes uploading, downloading, sending, receiving, modifying, updating, deleting, or combinations thereof. In one or more embodiments, the mobile device location is identified by the base-station covering the mobile device. In one or more embodiments, the mobile device location is identified by the mobile device itself. In one or more embodiments, the determination that the identified mobile device location is outside of the drop zone is decided by any of the base-station covering the mobile device, the system controller coupled to the base-station, the mobile device itself, or any combinations thereof.

In ST305, transmission of the content chunk is delayed while the mobile device remains outside of the drop zones. In one or more embodiments of the invention, a tolerable delay period is pre-determined such that the delay is effective within the pre-determined tolerable delay. In one or more embodiments, the pre-determined tolerable delay is associated with the particular drop zone allocation as a result of solving the aforementioned Integer Linear Programming formulation using the greedy algorithm described in reference to TABLE 2 above and FIG. 3B below. In ST 306, the content chunk is transmitted in response to detecting the mobile device within the drop zones.

FIG. 3B shows a method of allocating drop zones in a mobile communication network based on analysis of historical statistical network traffic trace where the drop zones are used for delayed transmission of content chunks to/from a user mobile device. In one or more embodiments of the invention, the method steps described in FIG. 3B implement the greedy algorithm and may be used to perform ST302 of FIG. 3A above.

Initially in ST312, parameters used in the greedy algorithm are initialized based on the statistical trace. In one or more embodiments of the invention, the statistical trace is obtained using ST301 described in reference to FIG. 3A above. In one or more embodiments, the parameters include the set X of base-stations selected by the greedy algorithm as drop zones, the set C of historical content chunks in the statistical trace not yet covered (i.e., scheduled/assigned for postponed delivery at a designated base-station) by the greedy algorithm in any of the time bins, the set B of base-stations having at least one content chunk (c∈C) not yet covered at any of the time bins, and unused capacity $\zeta(b, t_i)$ at each base-station (b∈B) at each time bin $t_i$. In one or more embodiments, these parameters are initialized as described in reference to the example greedy algorithm depicted in TABLE 2 above.

In ST314, a determination is made as to whether the set C is empty. In the initial iteration this determination is typically no and the method proceeds to ST316. In later iterations, the determination may be yes in which case the method ends.

In ST316, a base station b is identified with the highest trajectory based content chunk (TBCC), which is calculated based on the statistical trace. An example TBCC calculation method is described in reference to TABLE 2 and FIG. 2D above. In one or more embodiments of the invention, the identified base station b with the highest TBCC of all base-stations in B is added to the set X and the method proceeds to ST318.

In ST318, a ranked list RC of (content chunk, time bin) pairs is generated for the newly added base-station b. An example method for generating the ranked list RC is described in reference to TABLE 2 and FIG. 2D above.

In ST 320, historical content chunks in RC are compared to identify one with earliest time bin $t_h$ when the base station b has non-zero unused capacity. This identified historical content chunk is then delivered at the base station b during the time bin $t_h$.

In ST322, the set C and the unused capacity $\zeta(b, t_h)$ is updated based on the content chunk delivered in ST320 to in turn generate an updated ranked list RC. Subsequently, the method proceeds to ST 324 where a determination is made as to whether the updated ranked list RC is now empty after the content chunk delivery in ST320. If the determination is no, then the method returns to ST320 to select the next historical content chunk and next time bin $t_h$ in the now updated ranked list RC to be delivered. If the determination is yes, then the method proceeds to ST314 to determine whether the set C is empty or not. If the determination is no, then the method proceeds to ST316 where the next base-station with now highest TBCC is selected and represented as base-station b for the next iteration of ST317 through ST324.

Figure 4:
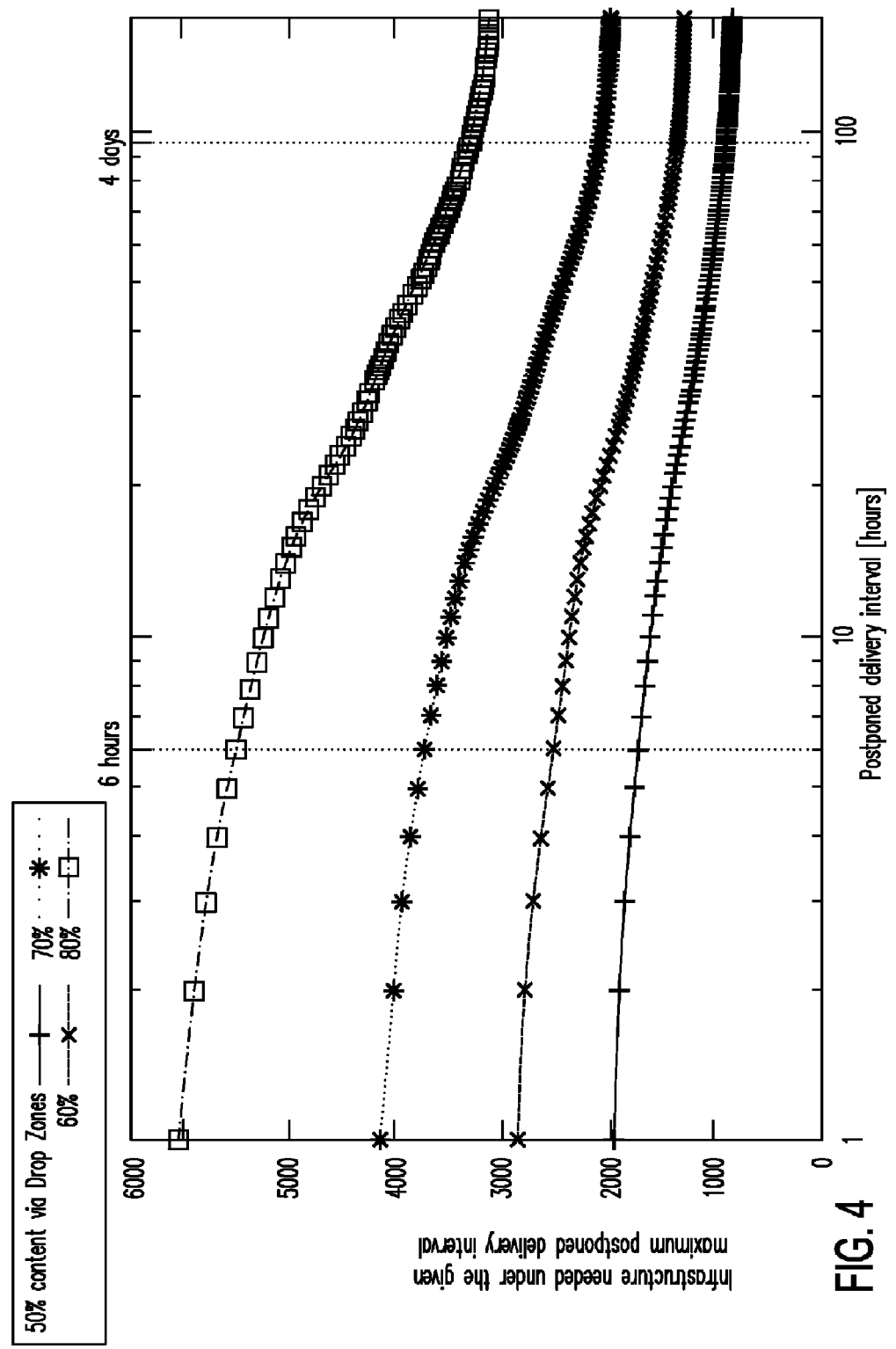
FIG. 4 shows an application example according to aspects of the invention.

FIG. 4 shows example results of drop zones allocation in the example mobile communication network using the method described in reference to FIG. 3 above based on the aforementioned greedy algorithm. As shown in FIG. 4, the horizontal axis represents maximum postponed content delivery interval (from 1 to 168 hours) used as parameter $D^{max}$ of the greedy algorithm while the vertical axis represents the number of drop zones identified in the example mobile communication network based on the aforementioned greedy algorithm and using historical network traffic trace extracted from the example mobile communication network. Here, four simulated results are plotted as curves corresponding to 50%, 60%, 70%, and 80% of the network traffic in the historical traces being processed using the identified drop zones. For example, to deliver 80% of traffic via Drop zones for 1 hour postponed delivery interval, three times more Drop zones (6,066 vs. 1,960) are required relative to the 50% content case.

Although specific formats, structures, or partitions are used as examples in the foregoing description regarding the various components in the data population engine, the data analysis engine, the alert engine, the target configuration, the target profile, the target data, the target hints, etc., one skilled in the art, with the benefit of this disclosure, will recognize that other formats or structures may also be used in the system, methods, and examples described without deviating from the spirit of the invention.

Figure 5:
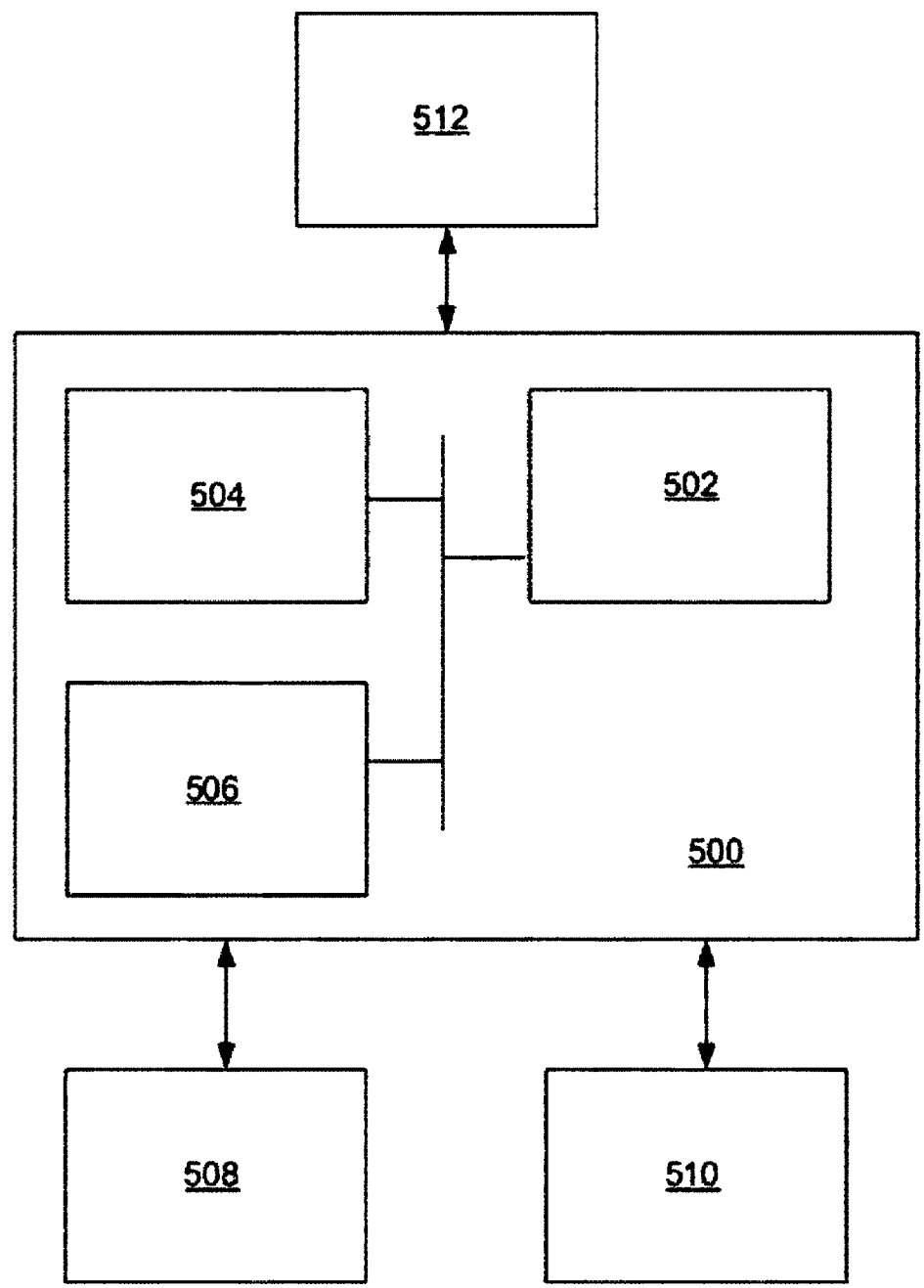
FIG. 5 shows a computer system according to aspects of the invention.

Embodiments of the invention may be implemented on virtually any type of computer regardless of the platform being used. For example, as shown in FIG. 5, a computer system (500) includes one or more processor(s) (502) (e.g., central processing unit or CPU), associated memory (504) (e.g., random document access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor) for example to display various results such as the feature vectors, the principal components, the application space, the signatures, etc. The computer system (500) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for content transmission in a cellular network having a plurality of cellular zones, comprising:
   obtaining a statistical trace associated with the cellular network, wherein the statistical trace comprises attributes of historical content chunks received from prior users of the cellular network and trajectories of the prior users moving within the plurality of cellular zones, wherein the attributes of the historical content chunks are indexed by the plurality of cellular zones;
   analyzing, using a central processing unit (CPU) of a computer, the statistical trace to identify a portion of the plurality of cellular zones as drop zones;
   allocating drop zone transmission bandwidth to the drop zones based on a pre-determined criterion;
   receiving, subsequent to the allocating, a transmission request for a content chunk from a mobile device of a user outside the drop zones;
   delaying transmission of the content chunk while the mobile device remains outside of the drop zones; and
   transmitting the content chunk in response to detecting the mobile device within the drop zones.

2. The method of claim 1, identifying the portion of the plurality of cellular zones as drop zones comprising:
   determining a cellular zone ranking according to a trajectory based content count (TBCC) calculated for each of the plurality of cellular zones based on the statistical trace; and
   identifying the drop zones from the plurality of cellular zones based on the cellular zone ranking.

3. The method of claim 2, determining the cellular zone ranking comprising:
   identifying a plurality of time bins in the statistical trace;
   identifying trajectories intersecting a cellular zone of the plurality of cellular zones for each of the plurality of time bins;
   calculating the TBCC of the cellular zone by tallying historical content chunks accessed along the trajectories intersecting the cellular zone over each of the plurality of time bins, wherein the historical content chunks are accessed preceding the cellular zone in each of the trajectories intersecting the cellular zone.

4. The method of claim 3, identifying the portion of the plurality of cellular zones as drop zones further comprising:
   determining a historical content chunk ranking within the cellular zone according to a tolerable delay allocated capacity (TDAC) calculated for each historical content chunk covered by the cellular zone; and
   identifying the drop zones from the plurality of cellular zones based on the historical content chunk ranking.

5. The method of claim 4, determining the historical content chunk ranking within the cellular zone comprising:
   identifying a portion of the plurality of time bins within a pre-determined tolerable delay period from a time bin during which a historical content chunk is accessed preceding the cellular zone in a trajectory intersecting the cellular zone, wherein the historical content chunk is covered by the cellular zone during the portion of the plurality of time bins; and
   calculating the TDAC of the historical content chunk within the cellular zone by tallying available capacity of the cellular zone during each time bin of the portion of the plurality of time bins, wherein the available capacity of the cellular zone is adjusted in response to postponed delivery of a previously identified historical content chunk from the cellular zone.

6. The method of claim 1, identifying the portion of the plurality of cellular zones as drop zones comprising:

iteratively determining a cellular zone ranking according to a trajectory based content count (TBCC) calculated for each of the plurality of cellular zones based on the statistical trace;

iteratively determining a historical content chunk ranking within each of the plurality of cellular zones according to a tolerable delay allocated capacity (TDAC) calculated for each historical content chunk covered by each of the plurality of cellular zones; and identifying the drop zones from the plurality of cellular zones based on the cellular zone ranking and the historical content chunk ranking, wherein iteratively determining the cellular zone ranking comprises iteratively adjusting the cellular zone ranking based on the historical content chunk ranking.

7. A non-transitory computer readable medium storing instructions for content transmission in a cellular network having a plurality of cellular zones, the instructions when executed by a processor of a computer comprising functionality for:

receiving, by a mobile device of a user, a command from the user to transmit a content chunk;

identifying, by the mobile device, the mobile device being outside a portion of the plurality of cellular zones designated as drop zones, wherein the drop zones are configured with upgraded communication bandwidth based on a pre-determined criterion; and delaying, by the mobile device, transmitting the content chunk in response to detecting the mobile device being outside the drop zones;

identifying, by the mobile device, the mobile device being within the drop zones; and transmitting, by the mobile device, the content chunk in response to detecting the mobile device being within the drop zones, wherein the portion of the plurality of cellular zones is designated as drop zones by analyzing a statistical trace associated with the cellular network, wherein the statistical trace comprises attributes of historical content chunks received from prior users of the cellular network and trajectories of the prior users moving within the plurality of cellular zones, wherein the attributes of the historical content chunks are indexed by the plurality of cellular zones.

8. A system for content transmission in a cellular network having a plurality of cellular zones, comprising:

a repository storing a statistical trace associated with the cellular network, comprising attributes of historical content chunks received from prior users of the cellular network and trajectories of the prior users moving within the plurality of cellular zones, wherein the attributes of the historical content chunks are indexed by the plurality of cellular zones;

a statistical trace analyzer configured to analyze the statistical trace to identify a portion of the plurality of cellular zones as drop zones; and a network controller configured to:

allocate drop zone transmission bandwidth to the drop zones based on a pre-determined criterion;

receive, subsequent to the allocating, a transmission request for a content chunk from a mobile device of a user outside the drop zones;

delay transmission of the content chunk while the mobile device remains outside of the drop zones; and transmit the content chunk in response to detecting the mobile device within the drop zones.

9. The system of claim 8, wherein identifying the portion of the plurality of cellular zones as drop zones comprises:

determining a cellular zone ranking according to a trajectory based content count (TBCC) calculated for each of the plurality of cellular zones based on the statistical trace; and identifying the drop zones from the plurality of cellular zones based on the cellular zone ranking.

10. The system of claim 9, wherein determining the cellular zone ranking comprises:

identifying a plurality of time bins in the statistical trace;

identifying trajectories intersecting a cellular zone of the plurality of cellular zones for each of the plurality of time bins;

calculating the TBCC of the cellular zone by tallying historical content chunks accessed along the trajectories intersecting the cellular zone over each of the plurality of time bins, wherein the historical content chunks are accessed preceding the cellular zone in each of the trajectories intersecting the cellular zone.

11. The system of claim 10, wherein identifying the portion of the plurality of cellular zones as drop zones further comprises:

determining a historical content chunk ranking within the cellular zone according to a tolerable delay allocated capacity (TDAC) calculated for each historical content chunk covered by the cellular zone; and identifying the drop zones from the plurality of cellular zones based on the historical content chunk ranking.

12. The system of claim 11, wherein determining the historical content chunk ranking within the cellular zone comprises:

identifying a portion of the plurality of time bins within a pre-determined tolerable delay period from a time bin during which a historical content chunk is accessed preceding the cellular zone in a trajectory intersecting the cellular zone, wherein the historical content chunk is covered by the cellular zone during the portion of the plurality of time bins; and calculating the TDAC of the historical content chunk within the cellular zone by tallying available capacity of the cellular zone during each time bin of the portion of the plurality of time bins, wherein the available capacity of the cellular zone is adjusted in response to postponed delivery of a previously identified historical content chunk from the cellular zone.

13. The system of claim 8, wherein identifying the portion of the plurality of cellular zones as drop zones comprises:

iteratively determining a cellular zone ranking according to a trajectory based content count (TBCC) calculated for each of the plurality of cellular zones based on the statistical trace;

iteratively determining a historical content chunk ranking within each of the plurality of cellular zones according to a tolerable delay allocated capacity (TDAC) calculated for each historical content chunk covered by each of the plurality of cellular zones; and identifying the drop zones from the plurality of cellular zones based on the cellular zone ranking and the historical content chunk ranking, wherein iteratively determining the cellular zone ranking comprises iteratively adjusting the cellular zone ranking based on the historical content chunk ranking.

* * * * *